(12) United States Patent
Iwasaki et al.

(10) Patent No.: US 10,914,256 B2
(45) Date of Patent: Feb. 9, 2021

(54) IN-VEHICLE CONTROLLER

(71) Applicant: TOYOTA JIDOSHA KABUSHIKI KAISHA, Toyota (JP)

(72) Inventors: Ryota Iwasaki, Okazaki (JP); Yoshitsugu Shinohara, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/585,077

(22) Filed: Sep. 27, 2019

(65) Prior Publication Data
US 2020/0149488 A1 May 14, 2020

(30) Foreign Application Priority Data

Nov. 13, 2018 (JP) .................................. 2018-212679

(51) Int. Cl.
| | |
|---|---|
| *B60W 10/02* | (2006.01) |
| *F02D 41/02* | (2006.01) |
| *B60W 10/06* | (2006.01) |
| *B60W 10/101* | (2012.01) |
| *F01N 3/023* | (2006.01) |
| *F16H 45/02* | (2006.01) |
| *F16H 41/24* | (2006.01) |

(52) U.S. Cl.
CPC ......... *F02D 41/025* (2013.01); *B60W 10/023* (2013.01); *B60W 10/06* (2013.01); *B60W 10/101* (2013.01); *F01N 3/023* (2013.01); *F02D 41/029* (2013.01); *B60W 2510/107* (2013.01); *B60W 2710/024* (2013.01); *B60W 2710/0627* (2013.01); *B60W 2710/1005* (2013.01); *F16H 41/24* (2013.01); *F16H 45/02* (2013.01)

(58) Field of Classification Search
None
See application file for complete search history.

(56) References Cited

U.S. PATENT DOCUMENTS

| | | | | |
|---|---|---|---|---|
| 8,660,762 | B2* | 2/2014 | Kato | F16H 59/72 |
| | | | | 701/53 |
| 9,561,798 | B2* | 2/2017 | Jerger | B60W 30/194 |
| 10,336,338 | B2* | 7/2019 | Nakamura | B60W 10/026 |
| 10,480,381 | B2* | 11/2019 | Suzuki | F01N 3/029 |
| 2018/0156097 | A1 | 6/2018 | Suzuki et al. | |

FOREIGN PATENT DOCUMENTS

JP       2018-090154 A      6/2018

* cited by examiner

*Primary Examiner* — Dirk Wright
(74) *Attorney, Agent, or Firm* — Oliff PLC

(57) ABSTRACT

An in-vehicle controller prohibits engagement of a lock-up clutch when a temperature of a fluid that actuates the lock-up clutch is lower than a prescribed temperature. In addition, the in-vehicle controller stops fuel injection by a fuel injection valve when fuel cut conditions including such a condition that the lock-up clutch is engaged are established. Under a situation where the temperature of the fluid is lower than the prescribed temperature, in the case where a PM accumulation amount on a filter is equal to or larger than an accumulation amount threshold, the in-vehicle controller executes speed increase processing so as to execute gear shift control of a continuously variable transmission such that a rotational speed of a turbine impeller in a torque converter is increased to be higher than that in a case where the PM accumulation amount is smaller than the accumulation amount threshold.

2 Claims, 4 Drawing Sheets

IN-VEHICLE CONTROLLER

INCORPORATION BY REFERENCE

The disclosure of Japanese Patent Application No. 2018-212679 filed on Nov. 13, 2018 including the specification, drawings and abstract is incorporated herein by reference in its entirety.

BACKGROUND

1. Technical Field

The present disclosure relates to an in-vehicle controller.

2. Description of Related Art

For example, in Japanese Patent Application Publication No. 2018-90154 (JP 2018-90154 A), an internal combustion engine that includes, in an exhaust passage, a filter for catching particulate matter (hereinafter referred to as PM) in exhaust gas is disclosed. In this internal combustion engine, so-called fuel cut, in which fuel injection from a fuel injection valve is stopped, is performed to supply oxygen to the filter. In this way, the PM accumulated in the filter is burned to regenerate the filter.

SUMMARY

By the way, in the case where a vehicle having an automatic transmission includes a torque converter having a lock-up clutch, it is preferred to perform the fuel cut for regeneration of the filter when prescribed fuel cut conditions including such a condition that the lock-up clutch is engaged are established. This is because, in the case where the lock-up clutch is engaged, a time required for an engine speed to be reduced from the engine speed at a start of the fuel cut to the engine speed recovered from the fuel cut is extended. Thus, compared to a case where the lock-up clutch is disengaged, a time for performing the fuel cut is extended. In this way, it is possible to secure a time for regenerating the filter.

However, when a temperature of a fluid that actuates the lock-up clutch is low, viscosity of the fluid is high, and controllability of the lock-up clutch is degraded. Thus, engaging operation of the lock-up clutch is prohibited until the temperature of such a fluid reaches an engagement permission temperature. As a result, when the temperature of the fluid is low, the above-described fuel cut conditions are less likely to be established, and thus the opportunity to regenerate the filter by the fuel cut is reduced.

An in-vehicle controller that solves the above problem is an in-vehicle controller for a vehicle including: an internal combustion engine, a torque converter having a lock-up clutch, and an automatic transmission connected to an output shaft of the torque converter. The internal combustion engine has: a fuel injection valve that supplies fuel to a cylinder; and a filter that is provided in an exhaust passage and catches particulate matter in exhaust gas. The torque converter has: a pump impeller that is provided on an input shaft of the torque converter; and a turbine impeller that is provided on the output shaft of the torque converter for transmission of torque between the pump impeller and the turbine impeller via a fluid. The lock-up clutch is a mechanism that is actuated by a pressure of the fluid. The in-vehicle controller executes: processing to prohibit engagement of the lock-up clutch when a temperature of the fluid is lower than a prescribed engagement permission temperature; processing to stop fuel injection from the fuel injection valve when prescribed fuel cut conditions, which includes such a condition that the lock-up clutch is engaged, are established; and speed increase processing to execute gear shift control of the automatic transmission such that, under a situation where the temperature of the fluid is lower than the engagement permission temperature, in the case where an accumulation amount of particulate matter on the filter is equal to or larger than a prescribed accumulation amount threshold, a rotational speed of the turbine impeller is increased to be higher than that in a case where the accumulation amount is smaller than the accumulation amount threshold.

According to this configuration, under the situation where the temperature of the fluid that actuates the lock-up clutch is lower than the engagement permission temperature, in the case where the accumulation amount of the particulate matter on the filter is equal to or larger than the prescribed accumulation amount threshold, the gear shift control of the automatic transmission is executed such that the rotational speed of the turbine impeller is increased to be higher than that in the case where the accumulation amount is smaller than the accumulation amount threshold.

When the rotational speed of the turbine impeller is increased, just as described, stirring of the fluid in the torque converter is promoted, and a temperature increase in the fluid is thereby promoted. Thus, the temperature of the fluid promptly reaches the engagement permission temperature. Accordingly, even in a state where the temperature of the fluid is low, the lock-up clutch can promptly be brought into an engaged state, and thus the above-described fuel cut condition is likely to be established. Just as described, according to this configuration, the temperature increase of the fluid is promoted. Thus, it is possible to promptly increase an opportunity to regenerate the filter by fuel cut.

In the in-vehicle controller, the automatic transmission may be a continuously variable transmission, the in-vehicle controller may control a gear shift ratio of the continuously variable transmission such that the rotational speed of the turbine impeller becomes a target turbine rotational speed that is a target value of the rotational speed, and, in the speed increase processing, the rotational speed of the turbine impeller may be increased by increasing the target turbine rotational speed.

According to this configuration, the gear shift ratio of the continuously variable transmission is controlled such that the rotational speed of the turbine impeller becomes the increased target turbine rotational speed. In this way, the rotational speed of the turbine impeller is increased.

Here, in the case where the automatic transmission is a stepped transmission (a multistage transmission), a gear shift ratio thereof is determined in advance. Thus, an increase in the target turbine rotational speed at the time of increasing the target turbine rotational speed by changing the gear shift ratio is restricted by the gear shift ratio, which is determined in advance. Meanwhile, in the case where the automatic transmission is the continuously variable transmission, the gear shift ratio thereof can be changed continuously. Thus, the increase in the target turbine rotational speed at the time of increasing the target turbine rotational speed can also be changed continuously. Therefore, a degree of freedom in setting of the increase in the target turbine rotational speed can be set higher than that in the case of the stepped transmission.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
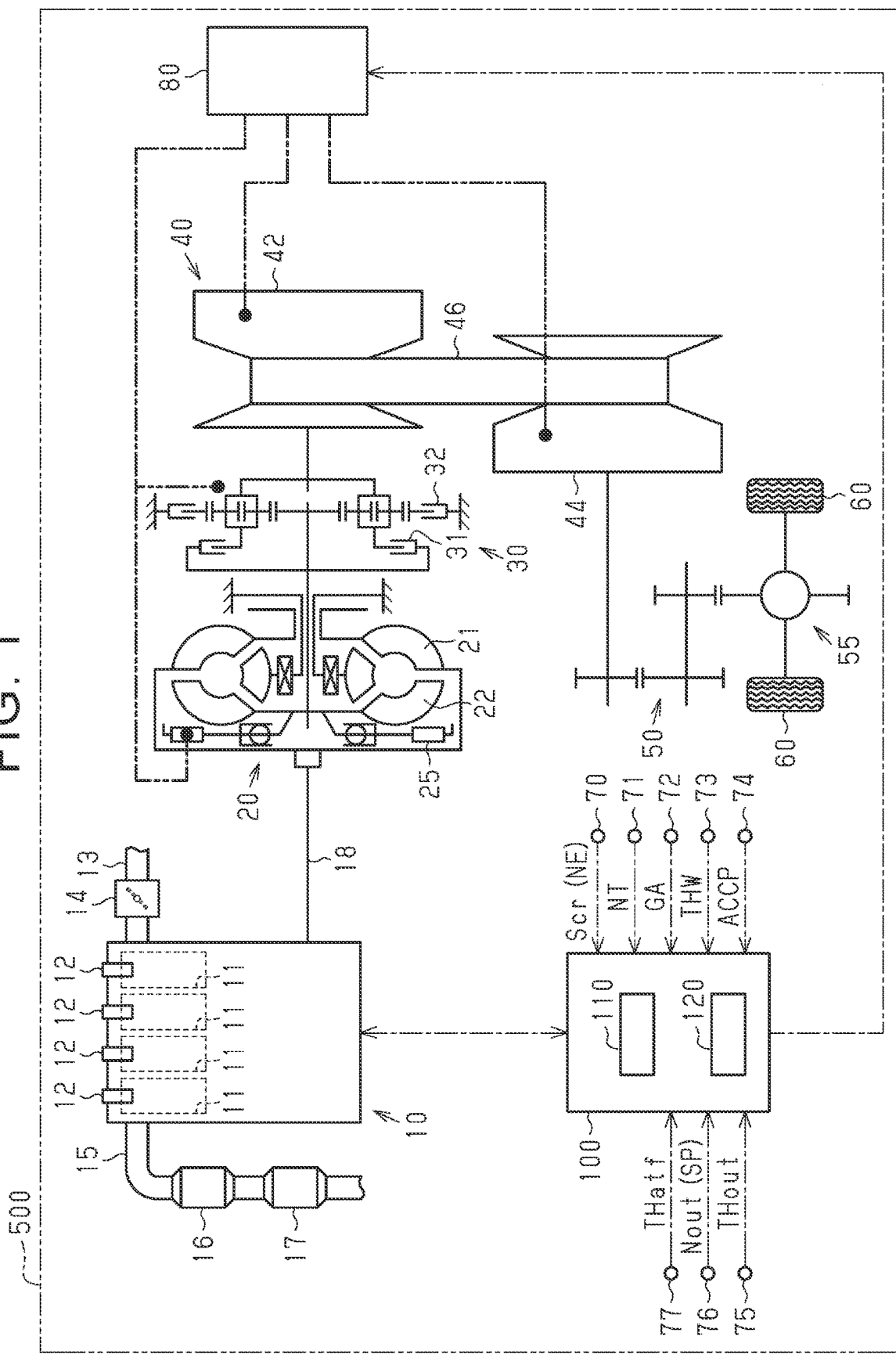
FIG. 1 is a schematic view of a vehicle, to which an embodiment of an in-vehicle controller is applied.

A description will be made on an embodiment of an in-vehicle controller with reference to FIG. 1 to FIG. 5. As illustrated in FIG. 1, an internal combustion engine 10 including cylinders 11 is mounted on a vehicle 500. An intake passage 13 is connected to an intake port of each of the cylinders 11. The intake passage 13 is provided with a throttle valve 14 for regulating an intake air amount.

The internal combustion engine 10 includes fuel injection valves 12 for supplying fuel to the cylinders 11. In a combustion chamber of each of the cylinders 11, air-fuel mixture of air suctioned through the intake passage 13 and the fuel injected from the fuel injection valve 12 is ignited by spark discharge and is thereby burned. Exhaust gas generated by burning of the air-fuel mixture in the combustion chambers is exhausted to an exhaust passage 15 connected to exhaust ports of the internal combustion engine 10.

The exhaust passage 15 is provided with a three-way catalyst (hereinafter referred to as a catalyst) as a catalyst for purifying the exhaust gas. This catalyst 16 oxidizes hydrocarbons (HC) and carbon monoxide (CO) contained in the exhaust gas for the purification, and reduces nitrogen oxides (NOx) contained in the exhaust gas for the purification.

A filter 17 for catching particulate matter (hereinafter referred to as PM) in the exhaust gas is provided at a position on a downstream side of the catalyst 16 in the exhaust passage 15. Drive power generated in the internal combustion engine 10 is transmitted to left and right drive wheels 60 sequentially through a torque converter 20 with a lock-up clutch, a switching mechanism 30, a continuously variable transmission 40 as a vehicular automatic transmission, a deceleration gear 50, a differential gear 55, and the like.

A pump impeller 21 is provided on an input shaft of the torque converter 20, and the input shaft is connected to a crankshaft 18 of the internal combustion engine 10. A turbine impeller 22 is provided on an output shaft of the torque converter 20, and the output shaft is connected to an input shaft of the switching mechanism 30. In this torque converter 20, torque is transmitted between the pump impeller 21 and the turbine impeller 22 via an automatic transmission fluid (ATF) as the fluid. In this way, the torque is transmitted from the input shaft to the output shaft of the torque converter 20.

A lock-up clutch (hereinafter described as LUC) 25 is a mechanism whose actuation state is changed by a hydraulic pressure of the above ATF. The actuation state of the LUC 25 is changed between an "engaged state" where the torque is transmitted between the input shaft and the output shaft of the torque converter 20 via the LUC 25 and a "disengaged state" where such an engaged state is canceled and a torque transmission amount via the LUC 25 becomes "0". Note that the "engaged state" in this embodiment includes: a "directly-coupled state" where the input shaft and the output shaft of the torque converter 20 are completely engaged; and a "slip state" where the input shaft and the output shaft of the torque converter 20 rotate relative to each other to a certain extent due to execution of flex lock-up control for controlling a slip amount of the LUC 25.

The switching mechanism 30 is a planetary gear mechanism of a double-pinion type, and includes a forward clutch 31 and a reverse clutch 32. An output shaft of the switching mechanism 30 is connected to an input shaft of the continuously variable transmission 40.

In this way, when the reverse clutch 32 is disengaged while the forward clutch 31 is engaged, the switching mechanism 30 is brought into a state where the drive power of the internal combustion engine 10, which is received via the torque converter 20, is transmitted as is as forward drive power to the continuously variable transmission 40. On the contrary, when the reverse clutch 32 is engaged while the forward clutch 31 is disengaged, the switching mechanism 30 is brought into a state where the drive power of the internal combustion engine 10, which is received via the torque converter 20, is transmitted as the drive power rotating reversely, that is, reverse drive power to the continuously variable transmission 40.

In this switching mechanism 30, when both of the forward clutch 31 and the reverse clutch 32 are disengaged, the transmission of the drive power between the internal combustion engine 10 and the continuously variable transmission 40 is cut off, and the continuously variable transmission 40 is brought into a so-called neutral state.

The continuously variable transmission 40 includes a primary pulley 42 provided on the input shaft, a secondary pulley 44 provided on an output shaft, and a belt 46 wound around a pair of those pulleys. The drive power is transmitted between the primary pulley 42 and the secondary pulley 44 via the belt 46. In addition, a gear shift ratio of the continuously variable transmission 40 is continuously changed by changing a winding radius of the belt 46 around the primary pulley 42 and the secondary pulley 44 using the hydraulic pressure.

The gear shift operation of the continuously variable transmission 40, the actuation of the LUC 25, the actuation of the switching mechanism 30, and the like are performed by controlling a hydraulic circuit 80 that is filled with the ATF. Various types of control such as engine control of the internal combustion engine 10, gear shift control of the continuously variable transmission 40, actuation control of the LUC 25, and actuation control of the switching mechanism 30 are executed by an in-vehicle controller (hereinafter referred to as a controller) 100 in the vehicle 500.

The controller 100 includes a central processing unit (hereinafter referred to as a CPU) 110 and memory 120 that stores control programs and data. Then, the various types of the control are executed when the CPU 110 executes the programs stored in the memory 120.

A crank angle sensor 70 for detecting a rotation angle of the crankshaft 18, a rotational speed sensor 71 for detecting a turbine rotational speed NT as a rotational speed of the turbine impeller 22, and an airflow meter 72 for detecting an intake air amount GA of the internal combustion engine 10 are connected to the controller 100. The controller 100 receives output signals from those various sensors. In addition, a coolant temperature sensor 73 for detecting a coolant temperature THW as a temperature of a coolant in the internal combustion engine 10 and an accelerator pedal position sensor 74 for detecting an accelerator pedal operation amount ACCP as an operation amount of an accelerator pedal are connected to the controller 100. The controller 100 receives output signals from those various sensors. Furthermore, an outside temperature sensor 75 for detecting an outside temperature THout, a secondary pulley rotational speed sensor 76 for detecting a rotational speed Nout of the secondary pulley 44, and a temperature sensor 77 for detecting a temperature of the ATF (an ATF temperature THatf) are also connected to the controller 100. The controller 100 also receives output signals from those various sensors.

Note that the controller 100 calculates an engine speed NE on the basis of an output signal Scr of the crank angle sensor 70. The controller 100 calculates an engine load factor KL on the basis of the engine speed NE and the intake air amount GA. The engine load factor KL represents a ratio of a current cylinder-inflow air amount to a cylinder-inflow air amount at the time when the internal combustion engine 10 is operated steadily in a fully loaded state. Here, the cylinder-inflow air amount is an amount of the air that flows into each of the cylinders 11 in an intake stroke. In addition, the controller 100 calculates a vehicle speed SP of the vehicle 500 on the basis of the rotation speed Nout of the secondary pulley 44.

The controller 100 calculates a filter temperature Tf as a temperature of the filter 17 on the basis of various engine operation states such as intake air charging efficiency and the engine speed NE. In addition, the controller 100 calculates a PM accumulation amount Ps as an accumulation amount of the particulate matter on the filter 17 on the basis of the engine speed NE, the engine load factor KL, the filter temperature Tf, and the like.

Figure 2:
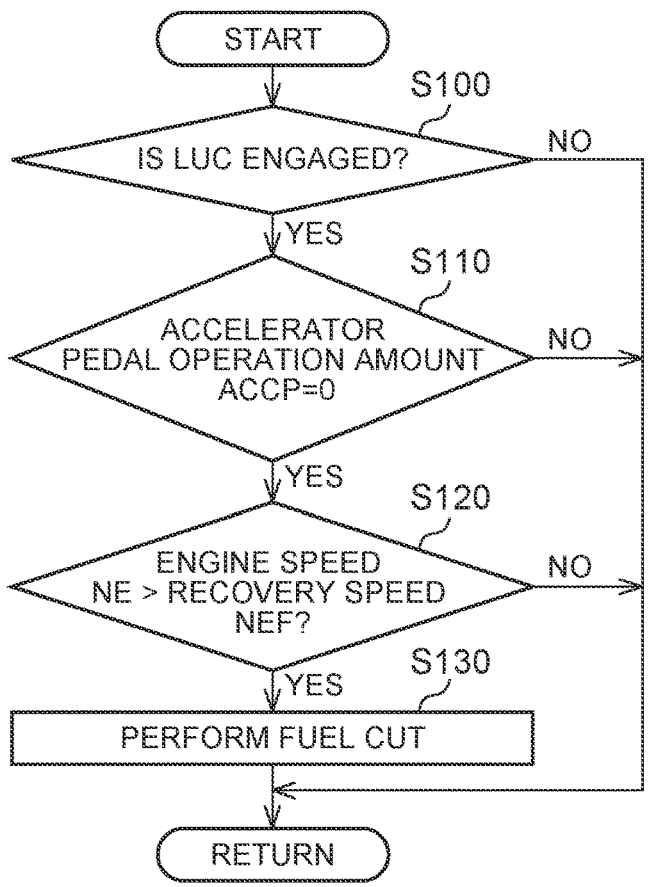
FIG. 2 is a flowchart illustrating a procedure of processing executed by the in-vehicle controller according to the same embodiment.

As one of the various types of the control, the controller 100 performs fuel cut for stopping the fuel injection by the fuel injection valves 12 when a prescribed fuel cut condition is established. FIG. 2 illustrates a processing procedure that is executed by the controller 100 for performing the fuel cut. The processing illustrated in FIG. 2 is executed when the CPU 110 executes the program stored in the memory 120 of the controller 100 in specified cycles. In the following description, step numbers will be described by numbers, to each of which "S" is added to the front.

When this processing is initiated, the controller 100 determines whether the LUC 25 is engaged (S100). Then, if determining that the LUC 25 is engaged (S100: YES), the controller 100 determines whether the accelerator pedal operation amount ACCP is "0" (S110). Then, if determining that the accelerator pedal operation amount ACCP is "0" (S110: YES), the controller 100 determines whether the engine speed NE exceeds a prescribed recovery speed NEF (S120). In the case where the engine speed NE becomes equal to or lower than the recovery speed NEF during the fuel cut, the controller 100 resumes the fuel injection by the fuel injection valves 12. If the engine speed NE exceeds the recovery speed NEF (S120: YES), the controller 100 determines that the fuel cut condition is established, and performs the fuel cut (S130). Then, this processing is terminated once. Note that the controller 100 terminates this processing once when making a negative determination in S100, when making a negative determination in S110, or when making a negative determination in S120.

In the case where the above-described fuel cut is performed when the filter 17 is in a high-temperature state, a large amount of oxygen is supplied to the filter 17. As a result, the PM accumulated on the filter 17 is burned and reduced. By such burning of the PM, so-called regeneration of the filter 17 is performed.

In the actuation control of the LUC 25 executed by the controller 100, any of the "directly-coupled state", the "slip state", and the "disengaged state" is selected as the actuation state of the LUC 25 basically on the basis of the accelerator pedal operation amount ACCP, the vehicle speed SP, and the like. Then, hydraulic pressure control of the LUC 25 is executed so as to bring the LUC 25 into the selected actuation state. Here, when the ATF temperature THatf is equal to or lower than a prescribed engagement permission temperature THaw and thus viscosity of the ATF is high, responsiveness of the LUC 25 at the time of starting the operation worsens, and thus controllability of the LUC 25 worsens. For such a reason, the controller 100 executes processing illustrated in FIG. 3.

Figure 3:
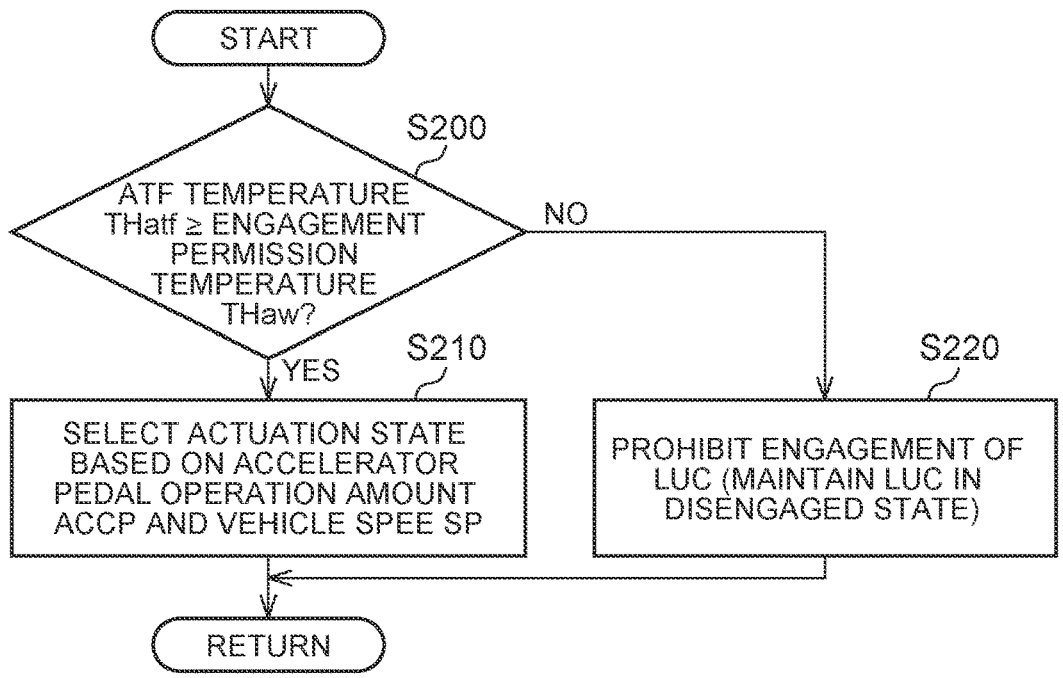
FIG. 3 is a flowchart illustrating a procedure of processing executed by the in-vehicle controller according to the same embodiment.

FIG. 3 illustrates a processing procedure that is executed by the controller 100. The processing illustrated in FIG. 3 is also realized when the CPU 110 executes the program stored in the memory 120 of the controller 100 in specified cycles.

When this processing is initiated, the controller 100 determines whether the ATF temperature THatf is equal to or higher than the engagement permission temperature THaw (S200). A value of this engagement permission temperature THaw is set such that it is possible to accurately determine that the current viscosity of the ATF is low enough so as not to have a negative impact on the controllability of the LUC 25 on the basis of the fact that the ATF temperature THatf is equal to or higher than this engagement permission temperature THaw.

Then, if determining that the ATF temperature THatf is equal to or higher than the engagement permission temperature THaw (S200: YES), the controller 100 selects the actuation state of the LUC 25 based on the accelerator pedal operation amount ACCP, the vehicle speed SP, and the like as described above (S210), and terminates this processing once.

On the other hand, if determining that the ATF temperature THatf is lower than the engagement permission temperature THaw (S200: NO), the controller 100 prohibits the engagement of the LUC 25, that is, maintains the disengaged state as the actuation state of the LUC 25 (S220), and terminates this processing once.

Figure 4:
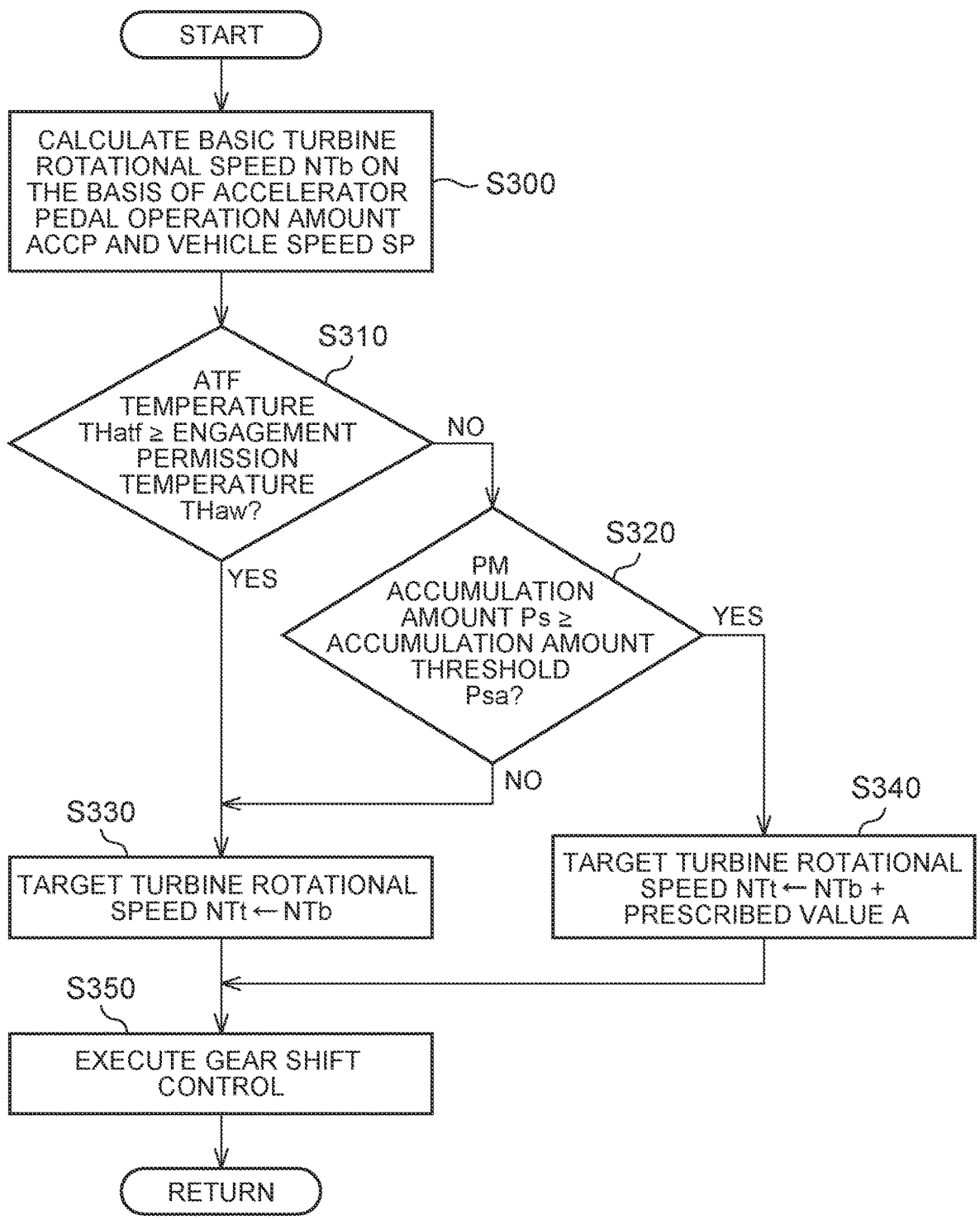
FIG. 4 is a flowchart illustrating a procedure of processing executed by the in-vehicle controller according to the same embodiment.

FIG. 4 illustrates a processing procedure of the gear shift control of the continuously variable transmission 40 that is executed by the controller 100. The processing illustrated in FIG. 4 is also realized when the CPU 110 executes the program stored in the memory 120 of the controller 100 in specified cycles.

When this processing is initiated, the controller 100 calculates a basic turbine rotational speed NTb as a basic target value of the turbine rotational speed NT, which is the rotational speed of the turbine impeller 22 synchronously rotating with the primary pulley 42, on the basis of the vehicle speed SP and the accelerator pedal operation amount ACCP (S300).

Figure 5:
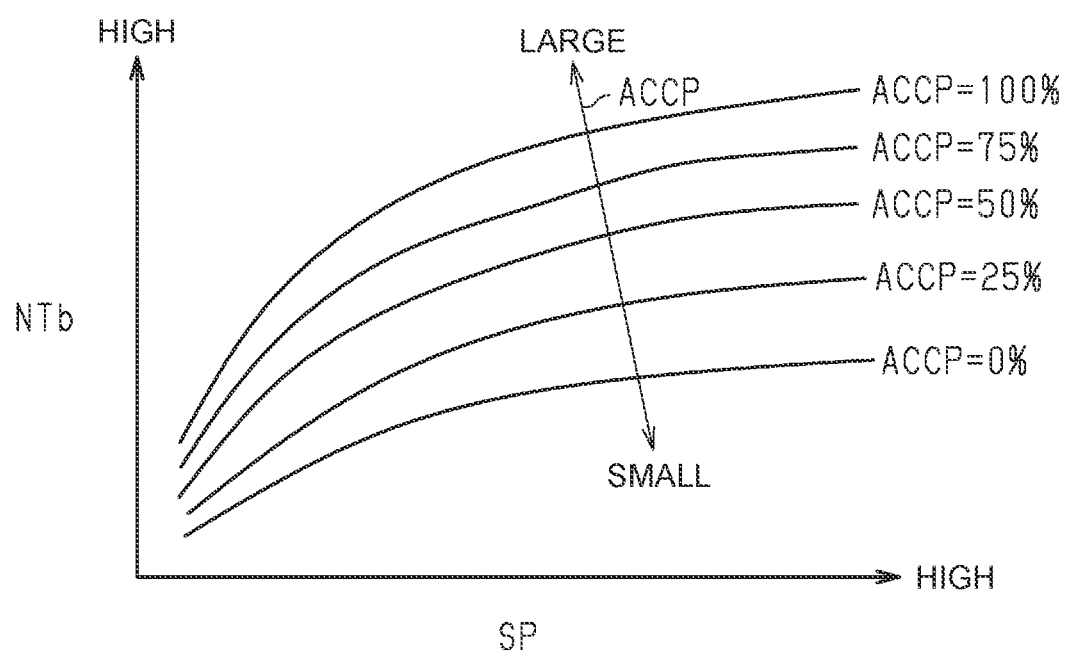
FIG. 5 is a graph illustrating a mode of setting control values of a turbine rotational speed in the same embodiment.

As illustrated in FIG. 5, the controller 100 calculates the basic turbine rotational speed NTb, which is suited from perspectives such as fuel economy and an exhaust gas property, on the basis of the vehicle speed SP and the accelerator pedal operation amount ACCP. In this embodiment, the calculated basic turbine rotational speed NTb becomes higher as the vehicle speed SP is increased or as the accelerator pedal operation amount is increased.

Next, the controller 100 determines whether the ATF temperature THatf is equal to or higher than the engagement permission temperature THaw (S310). Then, if determining that the ATF temperature THatf is equal to or higher than the engagement permission temperature THaw (S310: YES), the controller 100 sets the above basic turbine rotational speed NTb as a target turbine rotational speed NTt (S330).

On the other hand, if determining that the ATF temperature THatf is lower than the engagement permission temperature THaw (S310: NO), the controller 100 determines whether the currently calculated PM accumulation amount Ps is equal to or larger than a prescribed accumulation amount threshold Psa (S320). As this accumulation amount threshold Psa, such a PM accumulation amount is set in advance that clogging of the filter 17 is progressed to such an extent that the filter 17 has to be regenerated is set in advance.

Then, if determining that the PM accumulation amount Ps is smaller than the accumulation amount threshold Psa (S320: NO), the controller 100 sets the above basic turbine rotational speed NTb as the target turbine rotational speed NTt (S330).

On the other hand, if determining that the PM accumulation amount Ps is equal to or larger than the accumulation amount threshold Psa (S320: YES), the controller 100 sets, as the target turbine rotational speed NTt, a value that is acquired by adding a prescribed value A to the above basic turbine rotational speed NTb (S340). As the prescribed value A, a value that is appropriate to promote a temperature increase of the ATF is set in advance as will be described later.

In the case where the target turbine rotational speed NTt is set in S330 or S340 described above, the controller 100 executes the gear shift control (S350). In this gear shift control, the gear shift ratio of the continuously variable transmission 40 is controlled such that the actual turbine rotational speed NT is converged to the target turbine rotational speed NTt. Then, the controller 100 terminates this processing once.

By the way, when the prescribed value A is added to the basic turbine rotational speed NTb in the processing in S340, the controller 100 gradually adds the prescribed value A so as to prevent a rapid change in the target turbine rotational speed NTt. Also, when changing the target turbine rotational speed NTt set in S340 to the target turbine rotational speed NTt set in S330, the controller 100 gradually subtracts the added prescribed value A so as to prevent the rapid change in the target turbine rotational speed NTt.

The processing in S340 and S350 corresponds to speed increase processing in which the gear shift control of the automatic transmission is executed to increase the rotational speed of the turbine impeller. A description will now be made on action and effects of this embodiment.

(1) Under a situation where the ATF temperature THatf is lower than the engagement permission temperature THaw (S310 in FIG. 4: NO), in the case where the PM accumulation amount Ps is smaller than the accumulation amount threshold Psa (S320 in FIG. 4: NO), the basic turbine rotational speed NTb is set as the target turbine rotational speed NTt (S330).

On the other hand, under the situation where the ATF temperature THatf is lower than the engagement permission temperature THaw (S310 in FIG. 4: NO), in the case where the PM accumulation amount Ps is equal to or larger than the accumulation amount threshold Psa (S320 in FIG. 4: YES), the value that is acquired by adding the prescribed value A to the basic turbine rotational speed NTb is set as the target turbine rotational speed NTt (S340).

Thus, under the situation where the ATF temperature THatf is lower than the engagement permission temperature THaw, that is, under the situation where the engagement of the LUC is prohibited, in the case where the PM accumulation amount Ps is equal to or larger than the accumulation amount threshold Psa, the target turbine rotational speed NTt is increased by the prescribed value A in comparison with a case where the PM accumulation amount Ps is smaller than the accumulation amount threshold Psa. As a result, the rotational speed of the turbine impeller 22 is increased.

When the rotational speed of the turbine impeller 22 is increased, just as described, stirring of the ATF in the torque converter 20 is promoted, and the temperature increase of the ATF is thereby promoted. Thus, the ATF temperature THatf promptly reaches the engagement permission temperature THaw. Accordingly, even in a state where the ATF temperature THatf is low, the LUC 25 can promptly be brought into the engaged state, and thus the fuel cut condition, which has been described with reference to FIG. 2, is likely to be established. Just as described, in this embodiment, the temperature increase of the ATF is promoted. Thus, it is possible to promptly increase the opportunity to regenerate the filter 17 by the fuel cut.

(2) In the case where the automatic transmission in the vehicle 500 is a stepped transmission, the gear shift ratio thereof is determined in advance. Thus, a magnitude of an increase at the time of increasing the target turbine rotational speed NTt by changing the gear shift ratio is restricted by the gear shift ratio, which is determined in advance. Meanwhile, in this embodiment, since the automatic transmission in the vehicle 500 is the continuously variable transmission, the gear shift ratio thereof can continuously be changed. Thus, the magnitude of the increase at the time of increasing the target turbine rotational speed NTt can also be changed continuously. Therefore, a degree of freedom in setting of the increase in the target turbine rotational speed NTt can be set higher than that in the case of the stepped transmission.

This embodiment can be modified and implemented as follows. This embodiment and the following modified examples can be combined for implementation within the scope that does not contradict technically. Although the prescribed value A, which is added to the basic turbine rotational speed NTb in the processing of S340 in FIG. 4, has a fixed value, this prescribed value A may be set to be variable. For example, the prescribed value A may be set to be variable such that the prescribed value A is increased as the ATF temperature THatf is reduced. In this case, as the ATF temperature THatf is reduced, the increase in the target turbine rotational speed NTt is intensified. Thus, a temperature increase speed of the ATF can be increased.

In the processing of S340 in FIG. 4, the target turbine rotational speed NTt is increased to be higher than the basic turbine rotational speed NTb by adding the prescribed value A to the basic turbine rotational speed NTb. However, the target turbine rotational speed NTt may be increased in another way. For example, the target turbine rotational speed NTt may be increased to be higher than the basic turbine rotational speed NTb by multiplying the basic turbine rotational speed NTb by a prescribed value that is larger than "1" in the processing of S340.

In the above embodiment, the vehicular automatic transmission is the continuously variable transmission 40. In another embodiment, in the case where the vehicular automatic transmission is the stepped transmission (a multi stage transmission), the same operational effect as that in above (1) can be obtained by increasing the rotational speed of the turbine impeller 22 as follows.

More specifically, under the situation where the ATF temperature THatf is lower than the engagement permission temperature THaw, in the case where the PM accumulation amount Ps is equal to or larger than the accumulation amount threshold Psa, the gear shift control of the stepped transmission is executed so as to set a gear shift stage on the higher gear shift ratio side than that in the case where the PM accumulation amount Ps is smaller than the accumulation amount threshold Psa. In such a case, under the situation where the ATF temperature THatf is lower than the engagement permission temperature THaw, in the case where the PM accumulation amount Ps is equal to or larger than the accumulation amount threshold Psa, the gear shift ratio of the stepped transmission becomes higher than that in the case where the PM accumulation amount Ps is smaller than the accumulation amount threshold Psa. Thus, a rotational speed of an input shaft in the stepped transmission is increased. Then, due to such an increase in the rotational speed of the input shaft, the rotational speed of the turbine impeller 22, which is connected to the input shaft, is increased.

What is claimed is:

1. An in-vehicle controller for a vehicle including: an internal combustion engine; a torque converter having a lock-up clutch; and an automatic transmission coupled to an output shaft of the torque converter, the internal combustion engine having: a fuel injection valve that supplies fuel to a cylinder; and a filter that is provided in an exhaust passage and catches particulate matter in exhaust gas, the torque converter having: a pump impeller that is provided on an input shaft of the torque converter; and a turbine impeller that is provided on the output shaft of the torque converter to transmit torque between the pump impeller and the turbine impeller via a fluid, and the lock-up clutch being a mechanism that is actuated by a pressure of the fluid, wherein the in-vehicle controller executes:
processing to prohibit engagement of the lock-up clutch when a temperature of the fluid is lower than a prescribed engagement permission temperature;
processing to stop fuel injection from the fuel injection valve when prescribed fuel cut conditions, which includes such a condition that the lock-up clutch is engaged, are established; and
speed increase processing to execute gear shift control of the automatic transmission such that, under a situation where the temperature of the fluid is lower than the engagement permission temperature, in the case where an accumulation amount of particulate matter on the filter is equal to or larger than a prescribed accumulation amount threshold, a rotational speed of the turbine impeller is increased to be higher than that in a case where the accumulation amount is smaller than the prescribed accumulation amount threshold.

2. The in-vehicle controller according to claim 1, wherein the automatic transmission is a continuously variable transmission,
the in-vehicle controller controls a gear shift ratio of the continuously variable transmission such that the rotational speed of the turbine impeller becomes a target turbine rotational speed that is a target value of the rotational speed, and
in the speed increase processing, the rotational speed of the turbine impeller is increased by increasing the target turbine rotational speed.

* * * * *